United States Patent [19]

Federspiel

[11] 4,198,092
[45] Apr. 15, 1980

[54] SEAT SUSPENSION SYSTEM

[75] Inventor: Joseph A. Federspiel, Port Washington, Wis.

[73] Assignee: FMC Corporation, San Jose, Calif.

[21] Appl. No.: 889,473

[22] Filed: May 1, 1978

[51] Int. Cl.² ............................................. B60N 1/02
[52] U.S. Cl. .................................. 296/65 R; 297/345; 248/575
[58] Field of Search ............... 296/65 R, 63; 297/345; 248/602, 575, 578

[56] References Cited

U.S. PATENT DOCUMENTS

| 981,939 | 1/1911 | Persons | 248/575 |
|---|---|---|---|
| 1,261,396 | 4/1918 | Jackman | 248/628 |
| 1,747,932 | 2/1930 | Dufaux | 248/598 |
| 2,411,125 | 11/1946 | Borsheim | 248/578 |
| 2,530,041 | 11/1950 | Bennett | 56/13.6 |
| 3,185,241 | 5/1965 | Jackson | 180/53 |
| 3,229,452 | 1/1966 | Hasenbank | 56/25.4 |
| 3,447,399 | 6/1969 | Hungerford | 74/769 |
| 3,583,535 | 6/1971 | Plamper | 192/11 |
| 3,826,530 | 7/1974 | Hoffmeyer | 296/65 R |
| 3,841,696 | 10/1974 | Wagner | 296/65 R |

Primary Examiner—Philip Goodman
Attorney, Agent, or Firm—A. J. Moore; J. F. Verhoeven

[57] ABSTRACT

A seat suspension system includes a rigid support plate angled downwardly and pivoted to a supporting vehicle at the plate's forward end. A bucket seat is connected to the plate by hand screws that extend through slots in the plate to provide leg room adjustment. One end of the coil spring is adjustably attached to the seat support plate by a connector extending through a slot in the plate to provide forward and rearward adjustment, independent of the seat adjustment, thereby comfortably supporting operators of different heights and weights between about 100 and 400 pounds. A safety interlock switch prevents operation of the tractor unless an operator is in the seat, and a latch is provided to latch the seat in an inclined position when the tractor is not in use.

9 Claims, 3 Drawing Figures

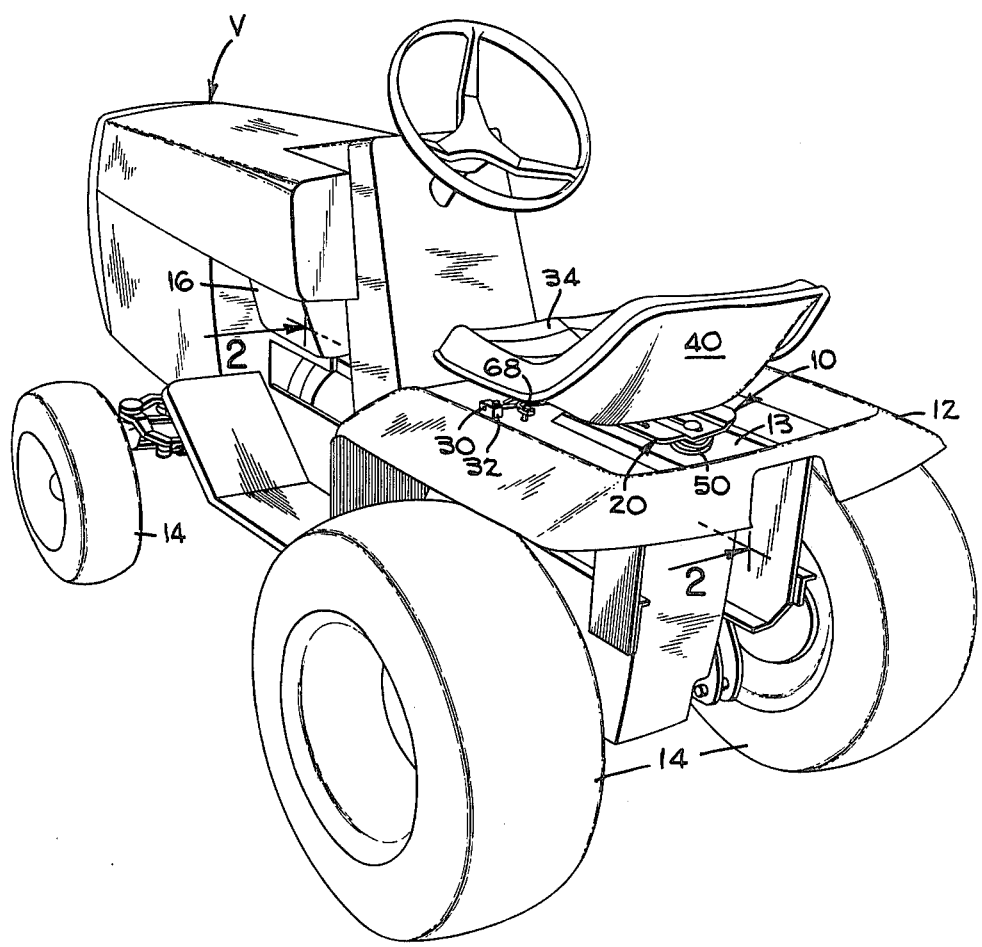
FIG_1

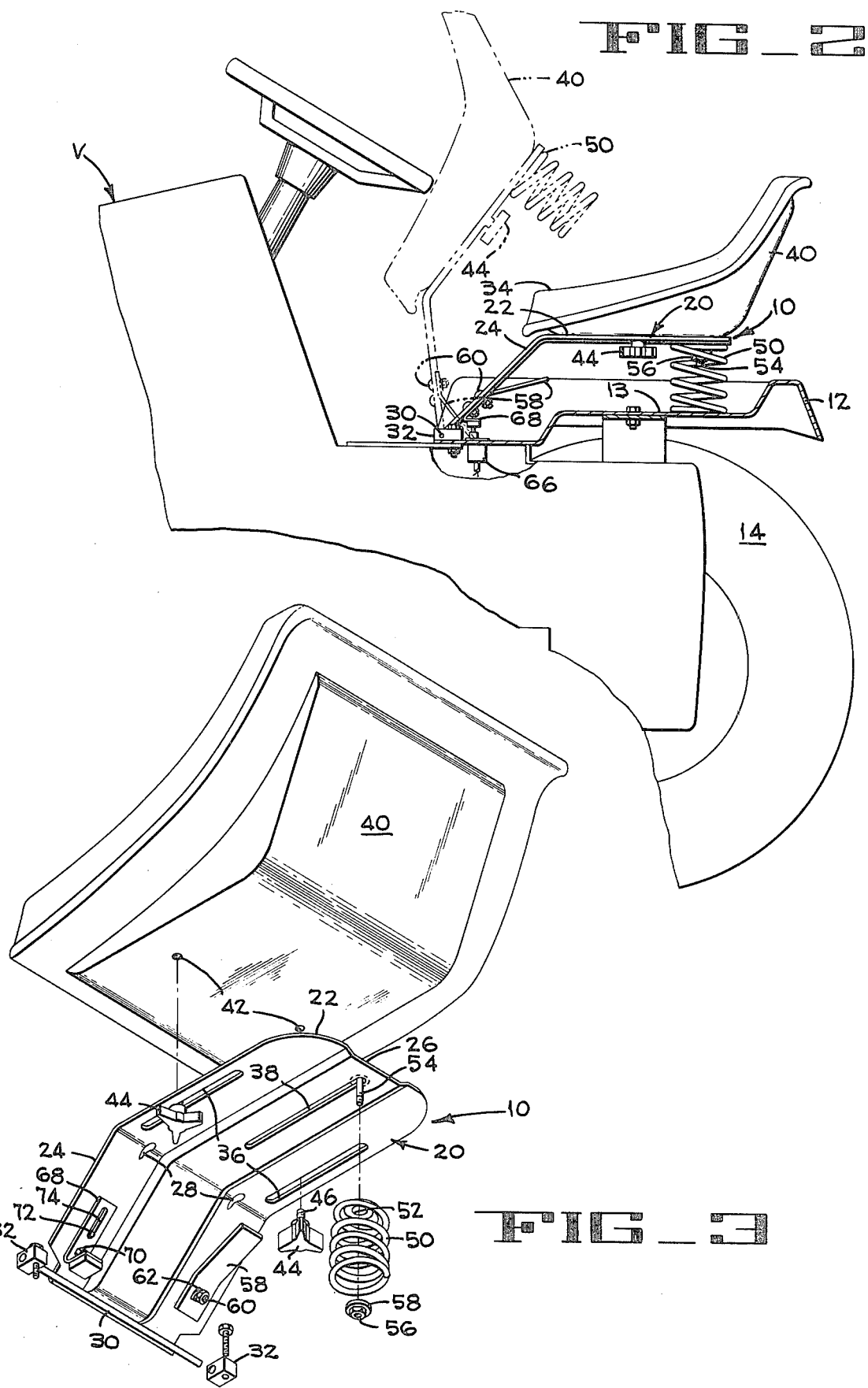

SEAT SUSPENSION SYSTEM

BACKGROUND OF THE INVENTION

1. Field of the Invention

The present invention relates to vehicle seat suspension systems for garden tractors or the like, and more particularly relates to seat suspension systems providing independent adjustments for leg room and for the weight of operators of considerably different height and weight.

2. Description of Prior Art

Many different types of seat suspension systems have been used in the past for garden tractors or the like. However, applicant knows of no system that is independently adjustable for both leg room and for differences in operator's weights.

Applicant's assignee has used leaf springs in seat suspensions for garden tractors and riding mowers for many years. Although such suspension systems were inexpensive, forward adjustment of the seat to provide leg room adjustability was limited to less than about two inches, and no provision was made to alter the spring position under the seat for operator comfort. Many of assignee's vehicles used seat suspensions with transversely extending leaf springs; while others used pairs of transversely spaced, longitudinally extending, U-shaped leaf springs. It was determined that it is difficult to control the rate, shape, and heat treatment of leaf springs, and that the springs were very often too stiff and had poor lateral stability.

Other seat suspension systems are evidenced by the following patents.

U.S. Jackman Pat. No. 1,261,396 which issued on Apr. 2, 1918 is representative of the prior art and discloses a foldable seat which is supported for leg room adjustment on a pair of leaf springs having forwardly curved ends pivoted to a vehicle. In one embodiment, a coil spring is connected to the seat to aid in supporting the rider. However, the coil spring is not adjustable relative to the position of the seat for providing independent leg room and weight adjustment for the rider's comfort.

U.S. Dufaux Pat. No. 1,747,932 which issued on Feb. 18, 1930 discloses an embodiment of a seat that is pivoted at its forward end and is supported at its rear end by a coil spring that is longitudinally adjustable. However, the seat is not adjustable to vary the leg room of persons of different heights.

U.S. Pat. No. 2,530,041 which issued on Nov. 14, 1950 discloses a seat mounted on a long narrow downwardly bent bar that is pivotally connected at its lower end to a vehicle. Although the seat is resiliently supported by a coil spring, no provision is made for weight or leg room adjustment, and the narrow width of the bar would indicate poor lateral stability of the seat.

U.S. Hoffmeyer Pat. No. 3,826,530 dated July 30, 1974 discloses a seat mounted on a garden tractor that is adjustable forwardly and rearwardly for varying leg room. However, adjustments for comfortably accommodating operators of different weights is not provided.

SUMMARY OF THE INVENTION

In accordance with the present invention a seat suspension system is provided for vehicles with means for independently adjusting the position of the seat and the position of a spring for comfortably accommodating operators of different height and weight.

The suspension system includes a rigid support plate pivoted at its forward end to the vehicle. A seat is connected to the plate and is adjusted longitudinally of the vehicle into a plurality of positions to provide leg room for operators of different heights. A coil spring is adapted to abut a portion of the vehicle and is connected to the plate for adjustment into a plurality of different positions longitudinally of the vehicle and independently of the seat adjustment to provide comfortable support for operators of different heights and weights.

It is therefore one object of the present invention to provide a seat suspension system that includes means for independently adjusting the seat and the spring substantial distances longitudinally of the vehicle to comfortably accommodate operators of considerably different heights and weights.

Another object is to provide an inexpensive seat suspension system which has good transverse stability, and which limits the seat to about two inches of vertical motion about an axis well forward of the seat to maintain the seat generally horizontal when supporting an operator.

Another object is to provide a seat suspension system that is adjustable forwardly to provide a very soft ride and rearwardly to provide a firm ride thereby covering a wide range of seating comfort regardless of operator size and weight.

Another object is to provide a pivotable seat support and means for latching the seat support in a tilted position to provide good drainage of undesirable materials such as rain and snow from the seat pan when the vehicle is not in operation.

Another object is to provide a seat which is longitudinally adjustable and which may be easily removed from the vehicle without the aid of tools.

BRIEF DESCRIPTION OF THE DRAWINGS

FIG. 1 is a perspective of a garden tractor illustrating the seat supporting system of the present invention with the seat near the forward end of its adjustment and the spring at the rear end of its adjustment.

FIG. 2 is an enlarged diagrammatic vertical section taken approximately along lines 2—2 of FIG. 1 illustrating the seat in solid lines in a generally horizontal operative position, and in dotted lines in an inclined inoperative position, the seat being positioned approximately midway of its range of adjustment.

FIG. 3 is an enlarged exploded view of a suspension system taken looking up from the left rear of the vehicle.

DESCRIPTION OF THE PREFERRED EMBODIMENT

The seat suspension system 10 (FIGS. 1-3) of the present invention is mounted on a vehicle V, with the vehicle being illustrated as a garden tractor having a fender assembly 12 with a flat intermediate spring supporting portion 13, four wheels 14, and an engine 16 for driving the rear wheel.

The seat suspension system 10 comprises a rigid seat supporting plate 20 having a generally horizontal seat supporting portion 22 and a forward downwardly inclined connecting portion 24. The plate 20 is preferably of one-piece construction with a central, longitudinally extending stiffening channel 26 formed therein to add to the rigidity of the plate. Dimples 28 are also stamped in the plate 20 at the junction of the horizontal and inclined portions to further stiffen the plate at this location. A pivot shaft 30 is welded to the forward end of the plate 20 and extends transversely of the vehicle. The free ends of the pivot shaft 30 are journaled in bearing blocks 32 bolted in fixed position to the vehicle well forward of the horizontal seat supporting portion 20 to maintain the seat pan 34 substantially horizontal when an operator is seated therein.

A pair of longitudinally extending widely spaced seat adjustment slots 36 (FIG. 3) are formed in the seat supporting portion 22 of the plate 20, and a single longitudinally extending spring adjustment slot 38 is transversely centered in the seat supporting portion 22 of the plate.

A seat 40, preferably a bucket seat, is provided with a pair of transversely spaced threaded holes 42 (FIG. 3) that are in alignment with the seat adjustment slots 36. A pair of hand screws 44 have reduced diameter threaded portions 46 that extend through associated ones of the slots 36 and are screwed into the associated ones of the threaded holes 42 in the seat 40. After the seat has been adjusted longitudinally of the vehicle to provide the desired leg room, the hand screws 44 are firmly tightened to clamp the seat 40 to the plate 20. It will be noted that no tools are needed to adjust the seat 40, and also that no tools are required to completely remove the seat from the vehicle as a theft preventative measure.

A weight supporting helical compression spring 50 preferably has its lower end ground flat and its upper end formed by a coil within a coil to provide a suitably flat upper end with a small connecting hole 52 therein. In order to improve the appearance of the spring 50 and to protect the paint on the spring supporting portion 13 of the vehicle fender 12, upon which the other end of the spring rests during normal operation, the spring 50 is preferably coated with vinyl.

The spring 50 is connected to the central spring adjustment slot 38 in its desired position of longitudinal adjustment as by a nut and bolt connector 54 which extends through the slot 38 and through the hole 52 in the upper end of the spring 50. The connector 54 includes a nut 56 welded to a washer 58 which frictionally engages the vinyl around the hole 52 with sufficient force to permit the operator to tighten or loosen the connector 54 by merely gripping the spring 50 by hand and turning in the proper direction. Thus, no tools are needed to adjust the spring. The spring preferably has a load rate of about 200 pounds per inch and has a working range of about 2 inches, and therefore is capable of resiliently supporting a 400 pound operator.

In the preferred embodiment the seat adjustment slots 36 are spaced about 7½ inches apart and are 6 inches long, while the spring adjustment slot 38 is about 7 inches long thus providing substantial amounts of independent longitudinal adjustment of the seat 40 and spring 50. Also, the bearing blocks 32 are spaced about 7¼ inches apart and the radius of the arcuate travel of the rear end of the plate 20 is about 16 inches thus providing good lateral support and little deviation of the seat supporting portion 22 of the plate 20 from its generally horizontal position during operation.

As indicated previously, it is desirable to tilt the seat 40 upwardly and to latch it in the tilted position illustrated in dotted lines in FIG. 2 in order to prevent rain, snow, and dirt or the like from accumulating in the pan 34 of the seat 40. A latch arm 58 (FIGS. 2 and 3) is pivotally supported on the inclined portion 24 of the seat supporting plate 20 by a bolt 60 and friction washer 62 which holds the latch arm in adjusted position. When it is desired to latch the seat 40 in tilted position, the latch arm 58 is manually pivoted from the inactive solid line position of FIGS. 2 and 3 to the active latching position indicated in dotted lines in FIG. 2 wherein the free end of the lever rests against the vehicle.

A safety interlock switch 66 (FIG. 2) is provided in order to prevent operation of the vehicle V unless the operator is in the seat 40. In the illustrated embodiment, the interlock switch 66 is secured to the vehicle in position to be actuated when the weight of the operator in the seat moves a horizontal portion of a bracket 68 (FIG. 3) against the actuating element of the switch 66. The bracket 68 is mounted for adjustment on the supporting plate by a bolt 70 that extends through a slot (not shown) in the supporting plate 20, and by a dimple 72 pressed in the plate 20 and projecting into a slot 74 in the bracket 68.

In operation of the seat suspension system 10 of the present invention, the operator may adjust the longitudinal position of the spring 50 through about a 7" range. If the operator prefers a soft ride, he will move the spring forward, without the aid of tools for loosening and thereafter tightening the bolt connector 54. If the operator prefers a firm support, he will adjust the spring 50 rearwardly. The desired position for optimum comfort can be ascertained by the operator by testing the suspension system 10 when he is seated on the seat after first adjusting the seat for leg room. When performing the leg room adjustments, a very short operator would adjust the seat forward by first loosening the hand screws 44 and then sliding the seat forward to the desired leg room position before again tightening the hand screws 44 to lock the seat 40 in adjusted position. This seat adjustment operation may be performed when the operator is seated in the seat by reaching down with both hands under the seat to manipulate both hand screws 44.

Since the axis of the pivot shaft 30 is a substantial distance forward of the normally horizontal seat supporting portion 22 of the seat supporting plate 20, and since the spring deflection is limited to approximately 2 inches, the arcuate travel of the seat pan 34 and the seat supporting portion 22 of the plate 20 will remain approximately horizontal during operation of the vehicle thus assuring operator comfort. Also, because of the relatively wide spacing of the bearing blocks 32 and the centrally located spring 50, both of which are connected to the rigid plate 20, the resulting three point suspension provides good lateral support for the operator.

When the vehicle is not in operation, it is apparent that the seat 40 may be latched in the upwardly inclined dotted line position illustrated in FIG. 2 by the latch arm 58; or the seat 40 may be removed in its entirety from the tractor and stored by merely removing the hand screws 44.

From the foregoing description it is apparent that the seat suspension system of the present invention provides for adjustment of the seat for providing desired leg room for operators of different heights; and provides independent adjustment of the spring relative to the seat to provide either soft or firm support in accordance with the operator's desires thereby satisfying the comfort requirements of operators of considerably different heights and weights.

Although the best mode contemplated for carrying out the present invention has been herein shown and described, it will be apparent that modification and variation may be made without departing from what is regarded to be the subject matter of the invention.

I claim:

1. A seat suspension system for a vehicle comprising; a rigid seat supporting plate having a rigid substantially horizontal seat supporting portion and a downwardly inclined forward portion when the seat is in an operator supporting position, means for pivotally connecting the forward end of the plate to the vehicle, a seat connected to said rigid seat supporting portion of the plate, a spring connected to said rigid seat supporting portion of the plate and adapted to abut a portion of the vehicle remote from the forward end of said plate, and means for independently adjusting the seat and the spring relative to and in the same plane as said rigid seat supporting portion in a direction longitudinally of the vehicle into pluralities of adjusted positions for comfortably supporting operators of different heights and weights, said spring being of predetermined strength and being the only resilient member in the seat suspension system for supporting the weight of the operators.

2. A seat suspension system for supporting an operator on vehicles such as garden tractors or the like comprising; a rigid seat supporting plate, means for pivotally connecting the forward end of said plate on the vehicle, a seat leg room adjustment means connecting said seat to said plate for selective forward and rearward movement of the seat longitudinally of the vehicle and for locking the seat in any one of a plurality of adjusted positions, a coil spring, and weight adjustment means connecting one end of said spring to said plate remote from said forward end of said plate for selective forward and rearward movement independent of said leg room adjustment and for locking the spring to said plate in any one of a plurality of adjusted positions, said coil spring adapted to comfortably support operators of different heights and weights when the other end of said spring is in abutting engagement with the vehicle, said spring being of predetermined strength and being the only resilient member in the seat suspension system for supporting the weight of both heavy and light operators.

3. A seat suspension system for vehicles such as tractors or the like comprising: a rigid seat supporting plate; means for pivotally connecting the forward end of said plate on the vehicle; a seat; leg room adjustment means connecting said seat to said plate for selective forward and rearward movement of the seat longitudinally of the vehicle and for locking the seat in any one of a plurality of adjusted positions; a coil spring; and weight adjustment means connecting one end of said spring to said plate for selective forward and rearward movement independent of said leg room adjustment and for locking the spring to said plate in any one of a plurality of adjusted positions; said coil spring adapted to comfortably support operators of different heights and weights when the other end of said spring is in abutting engagement with the vehicle; said leg room adjustment means comprising means defining a pair of parallel longitudinally extending slots in said plate, and clamping means for attaching said seat to said plate having a portion extending through said slots for permitting adjustment of the seat when loosened and for clamping the seat to said plate in adjusted position when tightened; said clamping means including means defining threaded holes in said seat aligned with said slots, and a pair of hand screws having threaded portions extending through said slots and screwed into said holes for clamping said seat in adjusted positions on said plate.

4. An apparatus according to claim 3 wherein said weight adjustment means comprises means defining a longitudinally extending slot in said plate, and clamping means for attaching said one end of said spring to said plate and having a portion extending through said slot for permitting adjustment of the spring when loosened and for clamping the spring to said plate in adjusted position when tightened.

5. A seat suspension system for vehicles such as garden tractors or the like comprising: a rigid seat supporting plate; means for pivotally connecting the forward end of said plate on the vehicle; a seat; leg room adjustment means connecting said seat to said plate for selective forward and rearward movement of the seat longitudinally of the vehicle and for locking the seat in any one of a plurality of adjusted positions; a coil spring; and weight adjustment means connecting one end of said spring to said plate for selective forward and rearward movement independent of said leg room adjustment and for locking the spring to said plate in any one of a plurality of adjusted positions; said coil spring adapted to comfortably support operators of different heights and weights when the other end of said spring is in abutting engagement with the vehicle; said weight adjustment means comprising means defining a longitudinally extending slot in said plate, and clamping means for attaching said one end of said spring to said plate and having a portion extending through said slot for permitting adjustment of the spring when loosened and for clamping the spring to said plate in adjusted position when tightened.

6. An apparatus according to claim 5 wherein said clamping means is a bolt connector.

7. A seat suspension system for vehicles such as garden tractors or the like comprising: a rigid seat supporting plate; means for pivotally connecting the forward end of said plate on said vehicle; a seat; leg room adjustment means connecting said seat to said plate for selective forward and rearward movement of the seat longitudinally of the vehicle and for locking the seat in any one of a plurality of adjusted positions; a coil spring; and weight adjustment means connecting one end of said spring to said plate for selective forward and rearward movement independent of said leg room adjustment and for locking the spring to said plate in any one of a plurality of adjusted positions; said coil spring adapted to comfortably support operators of different heights and weights when the other end of said spring is in abutting engagement with the vehicle; said rigid seat supporting plate being a one-piece plate having a substantially horizontal seat supporting portion and a downwardly inclined forward portion when the seat is in its operator supporting position; said horizontal seat supporting portion of said plate being selectively pivoted to a steeply inclined position when the vehicle is inoperable in order to drain water and snow from the seat, and additionally comprising latch means disposed between said plate and the vehicle to selectively latch the seat in its inclined position.

8. An apparatus according to claim 7 wherein said latch means is a lever pivotally supported on said plate and adapted to be pivoted to a position spaced from the vehicle during normal operation and a position engaging the vehicle when latching the seat in its inclined position.

9. A seat suspension system for vehicles such as garden tractors or the like comprising: a rigid seat supporting plate; means for pivotally connecting the forward end of said plate on the vehicle; a seat; leg room adjustment means connecting said seat to said plate for selective forward and rearward movement of the seat longitudinally of the vehicle and for locking the seat in any one of a plurality of adjusted positions; a coil spring; weight adjustment means connecting one end of said spring to said plate for selective forward and rearward movement independent of said leg room adjustment and for locking the spring to said plate in any one of a plurality of adjusted positions; said coil spring adapted to comfortably support operators of different heights and weights when the other end of said spring is in abutting engagement with the vehicle; and an interlock switch disposed between said plate and said body and operable to prevent operation of the vehicle unless an operator is seated on the seat.

* * * * *